(12) United States Patent
Dubois et al.

(10) Patent No.: US 9,088,147 B2
(45) Date of Patent: Jul. 21, 2015

(54) ELECTRICAL LINE FURNISHED WITH SCREEN-BREAK JUNCTIONS

(75) Inventors: David Dubois, Marck (FR); François Gahungu, Vieux-Reng (FR); Abdellatif Ait Amar, Calais (FR); Benoît Rollet, Maisons-Lafitte (FR); Pascal Streit, Mont-sur-Lausanne (CH)

(73) Assignee: NEXANS, Paris (FR)

( * ) Notice: Subject to any disclaimer, the term of this patent is extended or adjusted under 35 U.S.C. 154(b) by 310 days.

(21) Appl. No.: 13/527,772

(22) Filed: Jun. 20, 2012

(65) Prior Publication Data
US 2013/0000973 A1  Jan. 3, 2013

(30) Foreign Application Priority Data

Jul. 1, 2011  (FR) ...................................... 11 55946

(51) Int. Cl.
  *H01R 4/00*      (2006.01)
  *H02G 15/105*    (2006.01)
  *H02G 9/02*      (2006.01)
  *H02G 15/188*    (2006.01)

(52) U.S. Cl.
  CPC ............. *H02G 15/1055* (2013.01); *H02G 9/02* (2013.01); *H02G 15/188* (2013.01)

(58) Field of Classification Search
  CPC ............. H01R 4/40; H01R 4/723; H01R 4/20
  USPC .... 174/74 R, 74 A, 75 R, 76, 77 R, 78, 84 R, 174/88 R, 92, 93, 94 S
  See application file for complete search history.

(56) References Cited

U.S. PATENT DOCUMENTS

| 3,363,049 | A | * | 1/1968 | Gosling et al. ................... 174/85 |
| 3,544,700 | A | * | 12/1970 | Gazzana Priaroggia ..... 174/15.6 |
| 3,939,298 | A | * | 2/1976 | Gosling et al. .............. 174/21 R |
| RE28,837 | E | * | 6/1976 | Silva ............................... 174/78 |
| 4,032,205 | A | * | 6/1977 | Taj ................................. 439/208 |
| 4,234,756 | A | * | 11/1980 | Jackula et al. ................... 174/38 |
| 4,549,039 | A | * | 10/1985 | Charlebois et al. ......... 174/72 R |
| 4,742,184 | A | * | 5/1988 | Courty et al. ................ 174/73.1 |
| 6,040,527 | A | * | 3/2000 | De Buyst et al. ........... 174/88 C |
| 7,211,732 | B2 | * | 5/2007 | Yagi et al ..................... 174/74 R |

FOREIGN PATENT DOCUMENTS

| EP | 0 071 435 A | * | 2/1983 | ............... H01B 7/26 |
| EP | 2 088 656 A1 | * | 2/2008 | ........... H02G 15/105 |
| JP | 49-018087 | * | 2/1974 | ........... H02G 15/105 |

OTHER PUBLICATIONS

International Search Report dated Mar. 16, 2012.

* cited by examiner

*Primary Examiner* — William H Mayo, III
(74) *Attorney, Agent, or Firm* — Sofer & Haroun, LLP

(57) ABSTRACT

A three-phase, buried, high-voltage electrical line has three phase-conducting cables (2), each of the conducting cables (2) made of a succession of cable portions (3,3a,3b) connected together by different types of screen-break junctions (4), each junction (4) comprising a main structure (5) connecting a first portion (3a) to a second portion (3b) of cable (2). The main structure (5) of all the junctions (4) is identical and has a standard connection interface (7) connected to a first screen of the first portion (3a) and to a second screen of the second portion (3b), and in that a variable module (6,6a,6b,6c) furnished with a complementary connection interface (8) and with at least one linking cable (9,11,14,15), is capable of being plugged into the connection interface (7) of the main structure (5) of each junction (4).

10 Claims, 3 Drawing Sheets

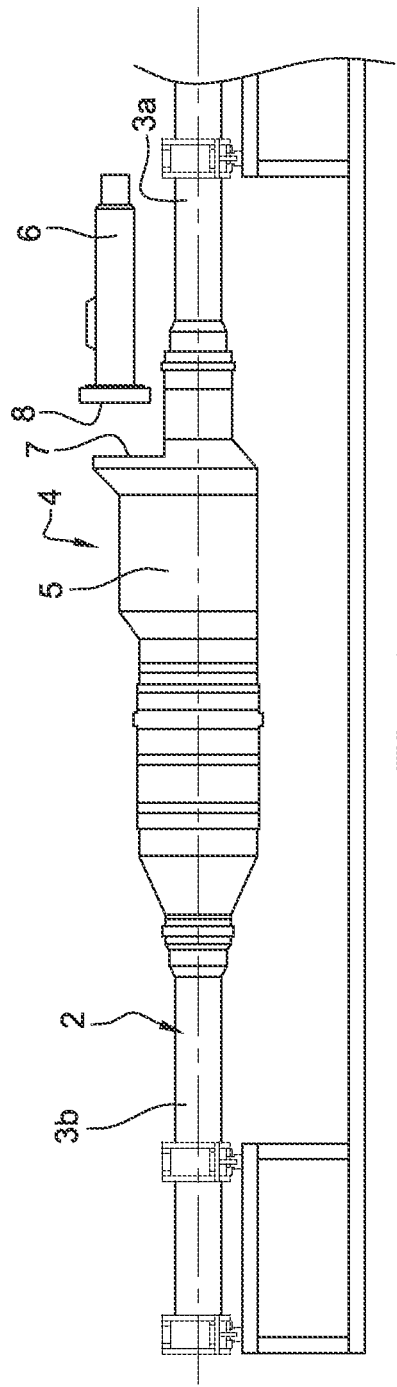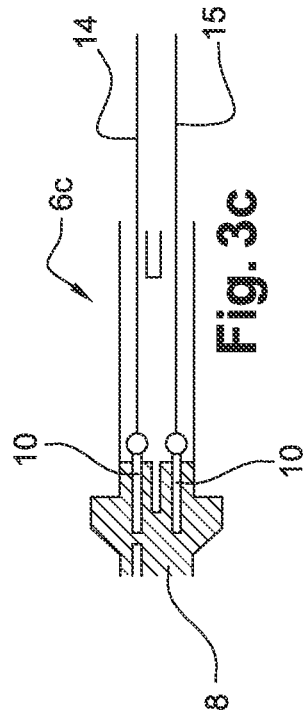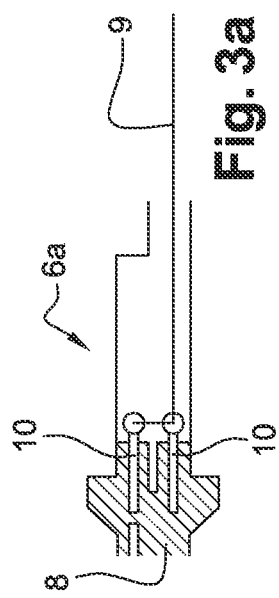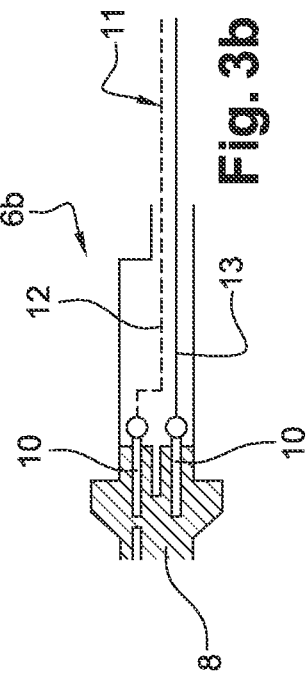

ELECTRICAL LINE FURNISHED WITH SCREEN-BREAK JUNCTIONS

RELATED APPLICATION

This application claims the benefit of priority from French Patent Application No. 11 55946, filed on Jul. 1, 2011, the entirety of which is incorporated by reference.

BACKGROUND

1. Field of the Invention

The invention relates to a three-phase, buried, high-voltage electrical line furnished with screen-break junctions. Such lines consist of three phase-conducting cables of which each comprises a succession of cable portions connected together by screen-break junctions. Specifically, each cable portion comprises a central conductor surrounded over the whole of its length by a metal screen, and the screens of two successive cable portions are unconnected within this type of junction in order notably to reduce the residual currents flowing in said screens due to the flow of the electrical current in the phase-conducting cables. The invention relates to a high-voltage electrical connection furnished with enhanced screen-break junctions.

2. Description of Related Art

For the rest of the description, the expressions "screen-break junction" and "screen-disconnect junction" are equivalent.

Screen-break junctions exist and have already been patented. It is possible, for example, to cite U.S. Pat. No. 3,363,049 which relates to a screen-break junction involving a coaxial linking cable of which the inner conductor is connected to a screen of one cable portion and of which the outer conductor is connected so a screen of the other cable portion. This patent describes a single type of screen-disconnect junction using a coaxial linking cable.

Three-phase, buried, high-voltage electrical lines consist of phase-conducting cables each formed by succession of cable portions placed end-to-end by means of screen-break junctions. These screen-break junctions may be of different types along said cables depending on the requirements encountered relating to the discharging of residual currents. It may be complicated and costly to have to develop and machine screen-break cable junctions having their own structural, functional and dimensional specific features.

OBJECTS AND SUMMARY

The high-voltage electrical lines according to the invention use different types of screen-break junctions having the particular feature of retaining a constant general structure and of involving a specific removable module linked to a particular desired application, said module being formed to be connected to said general structure. In other words, the general structure of these screen-break junctions has a standard connection interface, into which the desired module can be plugged, itself furnished with a standard complementary connection interface. Therefore, each type of junction is different from the other types of junction with respect to this variable module. Consequently, an electrical, line according to the invention can be produced rapidly and easily by installing therein rapidly and repetitively the same general structure of screen-break junction and then by inserting the modules that are adapted according to the encountered requirements.

The subject of the invention is a three-phase, buried, high-voltage electrical line comprising three phase-conducting cables, each of said conducting cables consisting of a succession of cable portions connected together by different types of screen-break junctions, each junction comprising a main structure connecting a first portion to a second portion of cable. The main feature of an electrical line according to the invention is that the main structure of all the junctions is identical and has a standard connection interface connected to a first screen of the first portion and to a second screen of the second portion, a variable module furnished with a complementary connection interface and with at least one linking cable, is capable of being plugged into the connection interface of the common main structure of each junction. In other words, all the screen-break junctions of the electrical line according to the invention have a standard and constant main structure, of which the essential function is to mechanically and electrically connect two successive portions of a phase-conducting cable and a variable module, of which the function is to discharge the residual electrical current flowing in the screens of said portions, this discharge being carried out via each linking cable of said module. It is important to emphasize that one type of module is different from another type of module with respect to the number and/or the nature of the linking cables that it involves. In this way, an electrical line according to the invention can be installed rapidly, effectively and with a degree of flexibility. Specifically, initially all the cable portions are joined together systematically and according to the same operational protocol by the standard main structure of the screen-break junctions. Secondly, depending on the requirements and on the local connections to be made, the most suitable module is connected to each of said main structures of said junctions that are already installed. Usually, the screens of the phase-conducting cables are metallic. The link between the standard connection interface of each main structure and the screens of the cable portions concerned and situated inside said structure is carried out by any means suitable for conducting the residual current flowing in said screens in order to discharge it to the outside, said means being able, for example, to consist of secondary inner cables. The connection interface of each of the main structures of the junctions therefore comprises two points of contact corresponding to these connections with the two screens of the junction. The result of this is that the complementary connection interface of each type of module also comprises two complementary contact points capable of being connected to the two contact points of the connection interface of said main structure.

Advantageously, the three cables have the same number of junctions placed substantially in the same locations along each of said cables so that the junctions of the three cables are grouped in zones placed along the line, the junctions of one and the same zone all being of the same type. In other words, an electrical line according to the invention is punctuated by several zones that are slightly spread out and that each contain three screen-break junctions of the same type, each junction of one and the same zone belonging to a different conducting cable. A zone that is slightly spread out is a zone that is spaced over a few meters. The grouping of junctions of the same type for each zone will make the interconnections easier in order to optimize the conditions of discharging of the residual electrical currents flowing in the metallic screens of the cable portions.

According to a first preferred embodiment of an electrical line according to the invention, the module is furnished with only one single-pole linking cable, the first and the second screen being electrically connected to said linking cable, the main structure and said module defining a first type of junction. In other words, the discharging of the residual currents flowing in the two screens situated at one and the same junction is carried out by only one single-pole linking cable installed in this first type of module. This means that the module is formed internally so as to create a current-conducting circuit making it possible to carry the residual currents from said screens to this one single-pole linking cable.

Preferably, the three single-pole linking cables originating from the three junctions of one and the same zone are connected to a direct grounding box. The box does not form an integral part of the electrical line but is situated in a zone containing the three junctions. This box comprises a connection unit that is connected directly to ground and in which the three single-pole linking cables are connected. In this manner, the residual currents flowing in the screens of the cable portions are directly discharged to ground.

According to a second preferred embodiment of an electrical line according to the invention, the module is furnished with a coaxial linking cable of which the inner conductor is designed to be connected to the first screen and of which the outer conductor is designed to be connected to the second screen, the main structure and said module defining a second type of junction. For this configuration, the discharging of the residual currents flowing in the two screens situated at one and the same junction is carried out by means of a coaxial linking cable installed in this second type of module. This means that this second type of module is formed internally so as to create a current-conducting circuit making it possible to carry the two residual currents from said screens to this coaxial linking cable.

Advantageously, the three coaxial linking cables originating from the three junctions of one and the same zone are connected to a three-coaxial-way box with cross-bonding. This box does not form part of the electrical line and is situated in parallel with the latter in the zone in question. Such a box is furnished with a connection unit linked to ground, and into which the three coaxial linking cables are connected. This configuration, which corresponds to an indirect cross-bonding of the screens, by means of this connection unit housed in the box, makes it possible to gain easier access to the screen connections when, for example, searching for a fault. Moreover, it is then possible to house in this box surge suppressors or lightning arrestors the function of which is then to limit the possible power surges applied to the screen-breaks of the junctions.

According to a third preferred embodiment of an electrical line according to the invention, the module is furnished with two single-pole linking cables, one cable being connected to the first screen and the other cable being connected to the second screen, the main structure and said module defining a third type of junction. For this configuration, the discharging of the residual current of each screen involved in one and the same junction is carried out via a single-pole linking cable originating in this third type of module.

Preferably, one single-pole linking cable of a first junction is connected to a screen of a second junction, the other connecting cable of the first junction being connected to a screen of the third junction. In other words, each of the three junctions belonging to one and she same zone is connected to the other two junctions on the same schematic. This configuration corresponding to a direct cross-bonding of the screens makes it possible to cross-bond the screens where protection by lightning arrestors is not necessary.

Advantageously, the screens of the phase-conducting cables are made of a metal chosen from the group formed by aluminum, lead, steel and copper. They may also be made by means of combination of several metal layers of a different type.

The invention also relates to a screen-break junction for the use of a high-voltage electrical line according to the invention. In order to prevent any ambiguity, the junction according to the invention corresponds to the assembly consisting of the common main structure and the variable module connected to said structure.

The electrical lines according to the invention have the advantage of being produced easily, rapidly and with a degree of flexibility because of the nature of the screen-disconnect junctions that they are made of. Specifically, since the main structures of all the junctions are identical, they can be installed along the phase-conducting cables systematically and repetitively using the same simple and rapid operation. Secondly, the appropriate module is inserted into each of the main structures that are already installed, the choice of said module being dictated by a particular requirement and/or by local constraints. Furthermore, they have the advantage of using various types of screen-break junctions along the phase cables comprising them, thus making it possible to optimize the conditions of discharging the residual electrical current flowing in the metal screens of the portions forming said cables.

BRIEF DESCRIPTION OF THE DRAWINGS

Given below is a detailed description of a preferred embodiment of a high-voltage electrical line according to the invention, making reference to FIGS. 1 to 4*c*.

FIG. 2 is a view from the side of a screen-break junction according to the invention, FIG. 3*a* is a schematic view of a first type of module of a screen-break junction according to the invention, FIG. 3*b* is a schematic view of a second type of module of a screen-break junction according to the invention, FIG. 3*c* is a schematic view of a third type of module of a screen-break junction according to the invention.

DETAILED DESCRIPTION

Figure 1:
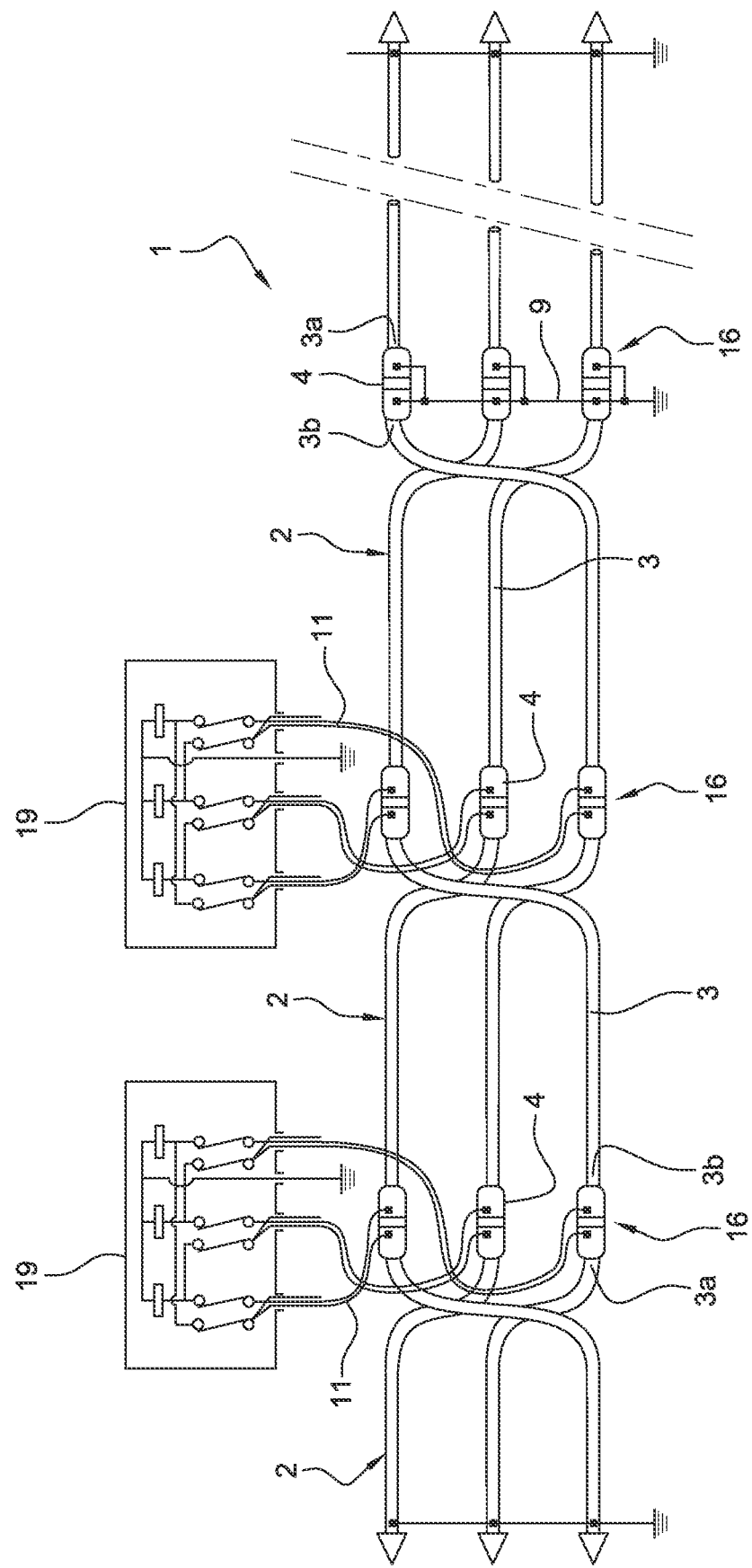
FIG. 1 is a schematic view of a buried, three-phase, high-voltage electrical line according to the invention.

With reference to FIG. 1, a buried, three-phase, high-voltage electrical line 1 comprises three phase-conducting cables 2, of which each comprises a succession of cable portions 3 placed end to end to form said cables 2. A portion 3 of cable 2 consists of a central metallic conductor usually surrounded by an insulating material and by a metallic cylindrical screen preferably made of aluminum, of lead, of steel or of copper.

With reference to FIG. 2 and to FIGS. 3*a*, 3*b* and 3*c*, two successive portions 3*a*, 3*b* of cable 2 are connected together by a screen-break junction 4 consisting of a standard main structure 5 and by a removable module 6. At these junctions 4, the conducting portions of the two successive cable portions 3*a*, 3*b* are in contact and in continuity with one another while their metallic screens are disconnected notably in order to reduce the residual electrical currents flowing in said screens, and due to the current travelling in the conducting cables 2.

The high-voltage lines according to the invention comprise various types of screen-break junctions 4.

With reference to FIG. 2, the main structure 5 of each junction 4 can be likened to a profiled cylindrical body made of copper or of aluminum, said structure 5 acting as a protection making the mechanical and electrical link of two successive portions 3a, 3b of cable 2. This main structure 5 is constant and common to all the screen-break junctions 4 placed along the line 1 on the three cables 2. This main structure 5 has a standard connection interface 7 connected to the two disconnected metallic screens belonging to two successive portions 3a,3b of cable 2, this link with said screens being made with current-conducting means, such as for example inner secondary cables. This standard connection interface 7 therefore has two points of contact corresponding to the two links with said screens. A variable and removable module 6, furnished with a connection interface 8 that complements that of the main structure 5, may be plugged into the standard connection interface of said structure 5, said module 6 comprising at least one linking cable. This removable module 6 is variable, but, irrespective of its version, it retains a connection interface 8 that is standard and complements the interface 7 of the main structure 5. This complementary connection interface 8 comprises two complementary points of contact designed to interact with the two points of contact of the connection interface 7 of the main structure in order to establish an electrical connection between the screens and the linking cable of said module 6. This variable module 6, furnished with its linking cable or cables will help to discharge the residual current flowing in the metallic screens of the portions 3 of cable 2. This variable module is available essentially in three versions.

With reference to FIG. 3a, a first module version 6a involves only one single-pole linking cable 9. This module 6a comprises two inner pins 10 extending the two links with the two metallic screens of the junction 4, once said module 6a has been installed in the main structure 5 of the junction 4. The single-pole linking cable 9 connects the end of the two inner pins 10 and protrudes from said module 6a.

With reference to FIG. 3b, a second module version 6b involves a coaxial linking cable 11. This module 6b comprises two inner pins 10 extending the two links with the two metallic screens of the junction 4, once said module 6b has been installed in the main structure 5 of the junction 4. The inner conductor 12 of this coaxial cable 11 connects the end of one of the two pins 10 while the outer conductor 13 of said coaxial cable 11 connects the end of the other pin 10. The coaxial linking cable 11 connects the end of the two pins 10 and protrudes from said module 6b.

With reference to FIG. 3c, a third module version 6c involves two single-pole linking cables 14,15. This module 6c comprises two inner pins 10 extending the two links with the two metallic screens of the junction 4, once said module 6b has been installed in the main structure 5 of the junction 4. One single-pole linking cable 14 connects the end of one of the two pins 10, while the other linking cable 15 connects the end of the other pin 10. The two single-pole linking cables 14,15 each connect one of the two pins 10 and protrude from said module 6c.

With reference to FIG. 1, each phase-conducting cable 2 has the same number of screen-break junctions 4, said junctions 4 being placed in the same locations along said cables 2. In this way, an electrical line 1 according to the invention is punctuated by several zones 16 that are slightly spread out and each contain three screen-break junctions 4 of the same type and which originate from each phase-conducting cable 2. Since the three junctions 4 of each of said zones 16 are of the same type, they make it possible therefore to produce various configurations in order to promote the discharge of the residual current flowing in the screens of the portions 3 of cable 2.

Figure 4A:
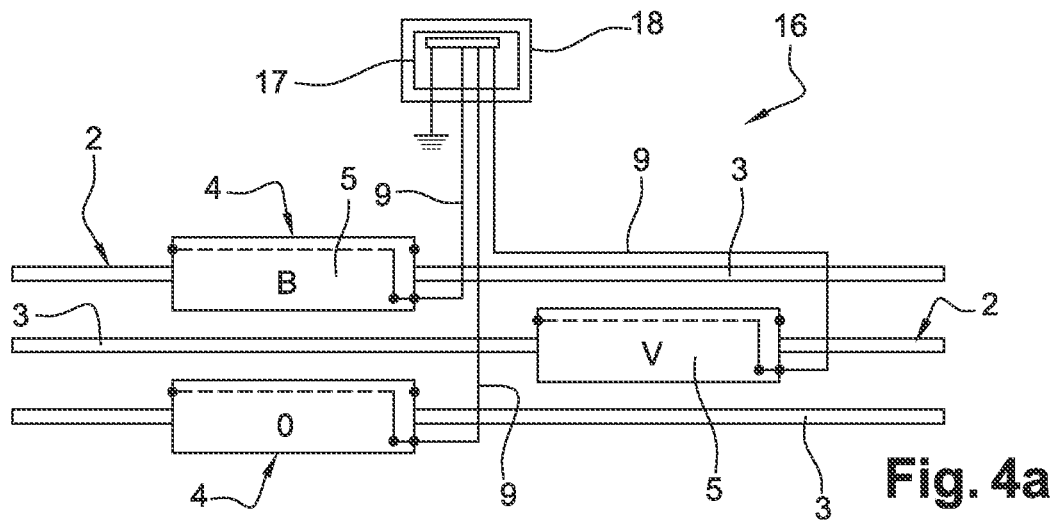
FIG. 4*a* is a schematic view of a zone of a high-voltage line according to the invention, comprising three junctions of the first type.

With reference to FIG. 4a, for a zone 16 containing three junctions 4 each furnished with a module 6a comprising only one single-pole linking cable 9, said three single-pole linking cables 9 are connected to a connection unit 17 connected to ground and housed in a box 18 outside the electrical line 1. The linking of these single-pole cables 9 with this connection unit 17 allows a direct grounding of the screens of the portions 3 of cable 2.

Figure 4B:
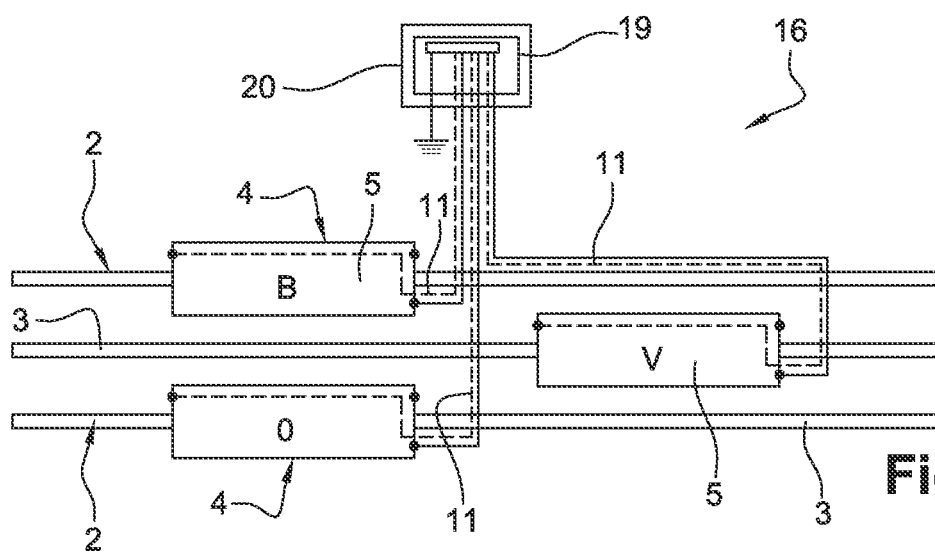
FIG. 4*b* is a schematic view of a zone of a high-voltage line according to the invention, comprising three junctions of the second type.

With reference to FIG. 4b, a zone 16 containing three junctions 4 each furnished with a module 6b comprising a coaxial linking cable 11, said three coaxial linking cables 11 are connected to a connection unit 19 linked to ground and housed in a box 20 outside the electrical line 1, said connection unit 19 having three coaxial ways with cross-bonding. This configuration is used to connect sheath lining conductors in order to protect the screen-breaks of the junctions 4 and to make the cross-bonding connections of said screens.

Figure 4C:
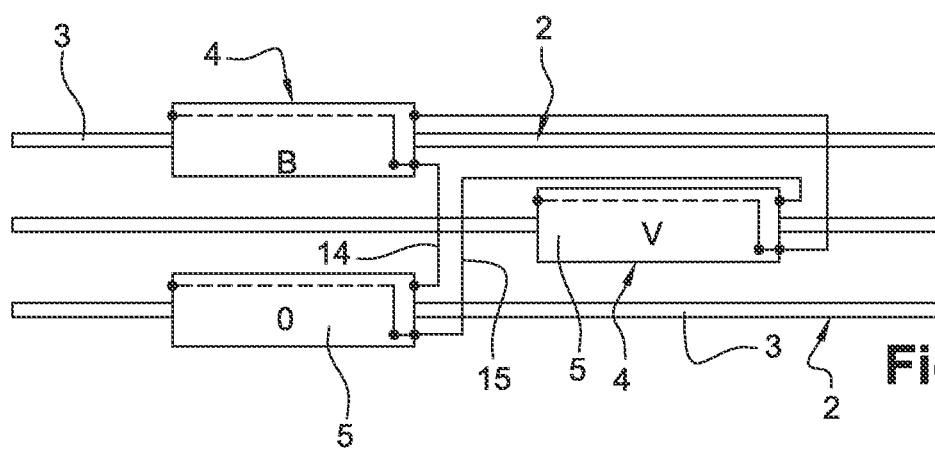
FIG. 4*c* is a schematic view of a zone of a high-voltage line according to the invention, comprising three junctions of the third type.

With reference to FIG. 4c, for a zone 16 containing three junctions 4 each furnished with a module 6c comprising two single-pole linking cables 14,15, one single-pole linking cable 14 of a first junction 4 is connected to a screen of a second junction 4, the other linking cable 15 of the first junction 4 being connected to a screen of the third junction 4. This schematic form making the link between the screens is repeated for the three junctions 4 of this same zone 16. This configuration corresponding to a direct cross-bonding of the screens makes it possible to reduce the currents flowing in the screens of the cables 2.

The invention claimed is:

1. Three-phase, buried, high-voltage electrical line comprising:
   three phase-conducting cables, each of said conducting cables made of a succession of cable portions connected together by different types of screen-break junctions, each junction having a main structure connecting a first portion to a second portion of cable,
   wherein the main structure of all the junctions is identical and has a single standard electric connection interface connected to a first screen of the first portion and to a second screen of the second portion, and wherein a single piece variable module furnished with a complementary connection interface and with at least one linking cable, is capable of being plugged into the connection interface of the main structure of each junction such that said module is in electrical contact with both said first and second screens.

2. Electrical line according to claim 1, wherein the three cables have the same number of junctions placed substantially in the same locations along each of said cables so that the junctions of the three cables are grouped in zones placed along the line, and in that the junctions of one and the same zone are all of the same type.

3. Electrical line according to claim 2, wherein the module is furnished with a coaxial linking cable of which the inner conductor is designed to be connected to the first screen and of which the outer conductor is designed to be connected to the second screen, the main structure and said module defining a second type of junction.

4. Electrical line according to claim 3, wherein the three coaxial linking cables originating from the three junctions of one and the same zone are connected to a three-coaxial-way box with cross-bonding.

5. Electrical line according to claim 2, wherein the module is furnished with two single-pole linking cables, one cable being connected to the first screen and the other cable being connected to the second screen, the main structure and said module defining a third type of junction.

6. Electrical line according to claim 5, wherein one single-pole linking cable of a first junction is connected to a screen of a second junction, and in that the other connecting cable of the first junction is connected to a screen of a third junction.

7. Electrical line according to claim 2, wherein the module is furnished with only one single-pole linking cable, the first and the second screen being electrically connected to said linking cable, the main structure and said module defining a first type of junction.

8. Electrical line according to claim 7, wherein the three single-pole linking cables originating from the three junctions of one and the same zone are connected to a direct grounding box.

9. Electrical line according to claim 1, wherein the screens are made of a metal selected from the group consisting of aluminum, lead, steel and copper.

10. A junction with screen breaks, wherein said junction with screen breaks are employed with said electrical line according to claim 1.

* * * * *